United States Patent
Homma (10) Patent No.: US 11,592,735 B2
(45) Date of Patent: Feb. 28, 2023

(54) IMAGE DISPLAY APPARATUS AND IMAGE DISPLAY UNIT

(71) Applicant: SONY CORPORATION, Tokyo (JP)

(72) Inventor: Keisuke Homma, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/981,090

(22) PCT Filed: Feb. 7, 2019

(86) PCT No.: PCT/JP2019/004385
§ 371 (c)(1),
(2) Date: Sep. 15, 2020

(87) PCT Pub. No.: WO2019/187682
PCT Pub. Date: Oct. 3, 2019

(65) Prior Publication Data
US 2021/0116797 A1    Apr. 22, 2021

(30) Foreign Application Priority Data

Mar. 29, 2018 (JP) .............................. JP2018-063485

(51) Int. Cl.
*G03B 21/20* (2006.01)
(52) U.S. Cl.
CPC ................ *G03B 21/2073* (2013.01)
(58) Field of Classification Search
CPC .. G03B 21/006; G03B 21/2073; G03B 21/14; G03B 21/00; G02B 27/0018; G02B 27/1026; G02B 27/149; H04N 5/74
See application file for complete search history.

(56) References Cited

U.S. PATENT DOCUMENTS

| | | | |
|---|---|---|---|
| 5,694,245 A | 12/1997 | Goto et al. | |
| 6,089,718 A * | 7/2000 | Hashizume | H04N 9/3167 348/E9.027 |
| 6,557,999 B1 * | 5/2003 | Shimizu | H04N 9/3141 348/E5.143 |

(Continued)

FOREIGN PATENT DOCUMENTS

| | | |
|---|---|---|
| CN | 102436068 A | 5/2012 |
| CN | 103105723 A | 5/2013 |

(Continued)

OTHER PUBLICATIONS

International Search Report dated Apr. 9, 2019 in PCT/JP2019/004385 filed on Feb. 7, 2019, 3 pages.

*Primary Examiner* — Magda Cruz
(74) *Attorney, Agent, or Firm* — Oblon, McClelland, Maier & Neustadt, L.L.P.

(57) ABSTRACT

An image display apparatus according to an embodiment of the present technology includes a polarizer, a polarization conversion element, and a ¼ wave plate. The polarizer causes to transmit linearly polarized light having a predetermined polarization direction. The polarization conversion element converts a polarization state of the linearly polarized light transmitted through the polarizer and emits the light as light in a non-polarized state. The ¼ wave plate is arranged on an optical path of the light in the non-polarized state emitted from the polarization conversion element.

11 Claims, 10 Drawing Sheets

(56) References Cited

U.S. PATENT DOCUMENTS

| | | |
|---|---|---|
| 6,650,472 B1 | 11/2003 | Adachi et al. |
| 2003/0202129 A1 | 10/2003 | Sekine et al. |
| 2004/0051945 A1 | 3/2004 | Adachi et al. |
| 2004/0057110 A1 | 3/2004 | Adachi et al. |
| 2004/0212748 A1* | 10/2004 | Suzuki ................. H04N 9/3105 349/8 |
| 2006/0017860 A1 | 1/2006 | Adachi et al. |
| 2006/0244920 A1* | 11/2006 | Kawaai .............. G03B 21/2073 353/20 |
| 2006/0262233 A1* | 11/2006 | Uehara ................ G03B 21/006 349/5 |
| 2007/0133090 A1 | 6/2007 | Adachi et al. |
| 2007/0139620 A1* | 6/2007 | Bruzzone ............. H04N 9/3105 348/E9.027 |
| 2009/0096992 A1 | 4/2009 | Amano |
| 2010/0053559 A1* | 3/2010 | Ushigome .......... G03B 21/2033 353/31 |
| 2010/0238411 A1* | 9/2010 | Tanaka ................ H04N 9/3167 353/31 |
| 2011/0019153 A1* | 1/2011 | Lee ....................... G02B 30/25 353/8 |
| 2012/0019782 A1 | 1/2012 | Amano |
| 2012/0162609 A1* | 6/2012 | Yamaguchi .......... H04N 9/3167 359/489.08 |
| 2013/0120713 A1* | 5/2013 | Homma ............... H04N 13/324 353/20 |
| 2013/0135590 A1* | 5/2013 | Homma ............. G03B 21/2073 353/20 |
| 2014/0063466 A1* | 3/2014 | Homma ............. G03B 21/2073 353/20 |
| 2018/0011391 A1 | 1/2018 | Homma |

FOREIGN PATENT DOCUMENTS

| | | | |
|---|---|---|---|
| CN | 103149780 A | 6/2013 | |
| CN | 204331253 U * | 5/2015 | ........... G03B 21/006 |
| EP | 1724636 A1 * | 11/2006 | ........... G03B 21/006 |
| JP | 8-334831 A | 12/1996 | |
| JP | 9-251150 A | 9/1997 | |
| JP | 2000-28807 A | 1/2000 | |
| JP | 2004-29692 A | 1/2004 | |
| JP | 2004046243 A * | 2/2004 | ............ G03B 21/10 |
| JP | 2004514174 A | 5/2004 | |
| JP | 2005065055 A * | 3/2005 | ............ H04N 15/00 |
| JP | 2006350291 A | 12/2006 | |
| JP | 2007-11248 A | 1/2007 | |
| JP | 2009-116311 A | 5/2009 | |
| JP | 2013-104933 A | 5/2013 | |
| JP | 2013-113984 A | 6/2013 | |
| JP | 2013-251798 A | 12/2013 | |
| JP | 2014-48383 A | 3/2014 | |
| TW | 200907541 A | 2/2009 | |
| WO | WO 02/41627 A2 | 5/2002 | |
| WO | WO-2009085856 A1 | 7/2009 | |

* cited by examiner

IMAGE DISPLAY APPARATUS AND IMAGE DISPLAY UNIT

TECHNICAL FIELD

The present technology relates to an image display apparatus and an image display unit.

BACKGROUND ART

In the related art, an image display apparatus such as a projector is widely used. In a projection apparatus described in Patent Document 1, between an emitting side of synthetic light of a color synthesizing prism, an incident side of a projection lens, a polarization conversion section capable of uniformly and omnidirectionally non-polarizing projected lights of all RGB is arranged. This makes possible to completely eliminate color unevenness of a 3D image without tilting a 3D glasses and to eliminate the color unevenness and a brightness drop of the 3D image with the 3D glasses tilted. As a result, it becomes possible to significantly improve a 3D image quality (see Patent Document 1, specification paragraphs [0154],[0155], FIG. 20, etc.).

CITATION LIST

Patent Literature

Patent Literature 1: Japanese Patent Application Laid-open No. 2013-113984

DISCLOSURE OF INVENTION

Technical Problem

Thus, there is a need for a technique capable of displaying a high-quality image.

In view of the above circumstances, an object of the present technology is to provide an image display apparatus capable of displaying a high quality image and an image display unit.

Solution to Problem

To achieve the above object, an image display apparatus according to an embodiment of the present technology includes a polarizer, a polarization conversion element, and a ¼ wave plate.

The polarizer causes to transmit linearly polarized light having a predetermined polarization direction.

The polarization conversion element converts a polarization state of the linearly polarized light transmitted through the polarizer and emits the light as light in a non-polarized state.

The ¼ wave plate is arranged on an optical path of the light in the non-polarized state emitted from the polarization conversion element.

In this image display apparatus, linearly polarized light transmitted through the polarizer is converted into the light in the non-polarized state. The ¼ wave plate is arranged on the optical path of the light in the non-polarized state. Thus, it becomes possible to prevent a reflection component of the light in the non-polarized state traveling in an opposite direction of the optical path from being reflected again by the polarizer. As a result, it becomes possible to display a high-quality image.

The image display apparatus may further include a light modulation element that modulates incident light and emits image light and a projection section for projecting the image light. In this case, the polarizer may be arranged on the optical path of the image light emitted from the light modulation element. In addition, the ¼ wave plate may be arranged between the polarization conversion element and the projection section.

The polarization conversion element may have an optical axis. In this case, the ¼ wave plate may be arranged such that a direction of an optical axis of the ¼ wave plate corresponds to a direction of the optical axis of the polarization conversion element.

The ¼ wave plate may be arranged such that an angle difference between the direction of the optical axis of the ¼ wave plate and the direction of the optical axis of the polarization conversion element is substantially 45 degrees.

The polarizer may have a transmission axis and may be arrange such that a direction of the transmission axis of the polarizer corresponds to the direction of the optical axis of the polarization conversion element.

The polarizer may be arranged such that the angle difference between the direction of the transmission axis of the polarizer and the direction of the optical axis of the polarization conversion element is substantially 45 degrees.

The polarization conversion element may be formed of a uniaxial crystal material or a uniaxial organic material.

The polarizer may be a polarizing plate.

An image display unit according to an embodiment of the present technology includes the polarizer, the polarization conversion element, and the ¼ wave plate.

The image display unit may further include a light modulation element that modulates the incident light and emits the image light. In this case, the polarizer may be arranged on the optical path of the image light emitted from the light modulation element.

ADVANTAGEOUS EFFECTS OF INVENTION

As described above, according to the present technology, it becomes possible to display a high-quality image. Note that the effect described here is not necessarily limitative, and any of the effects described in the present disclosure may be provided.

MODES FOR CARRYING OUT THE INVENTION

Hereinafter, embodiments of the present technology will be described with reference to the drawings.

Image Display Apparatus

Figure 1:
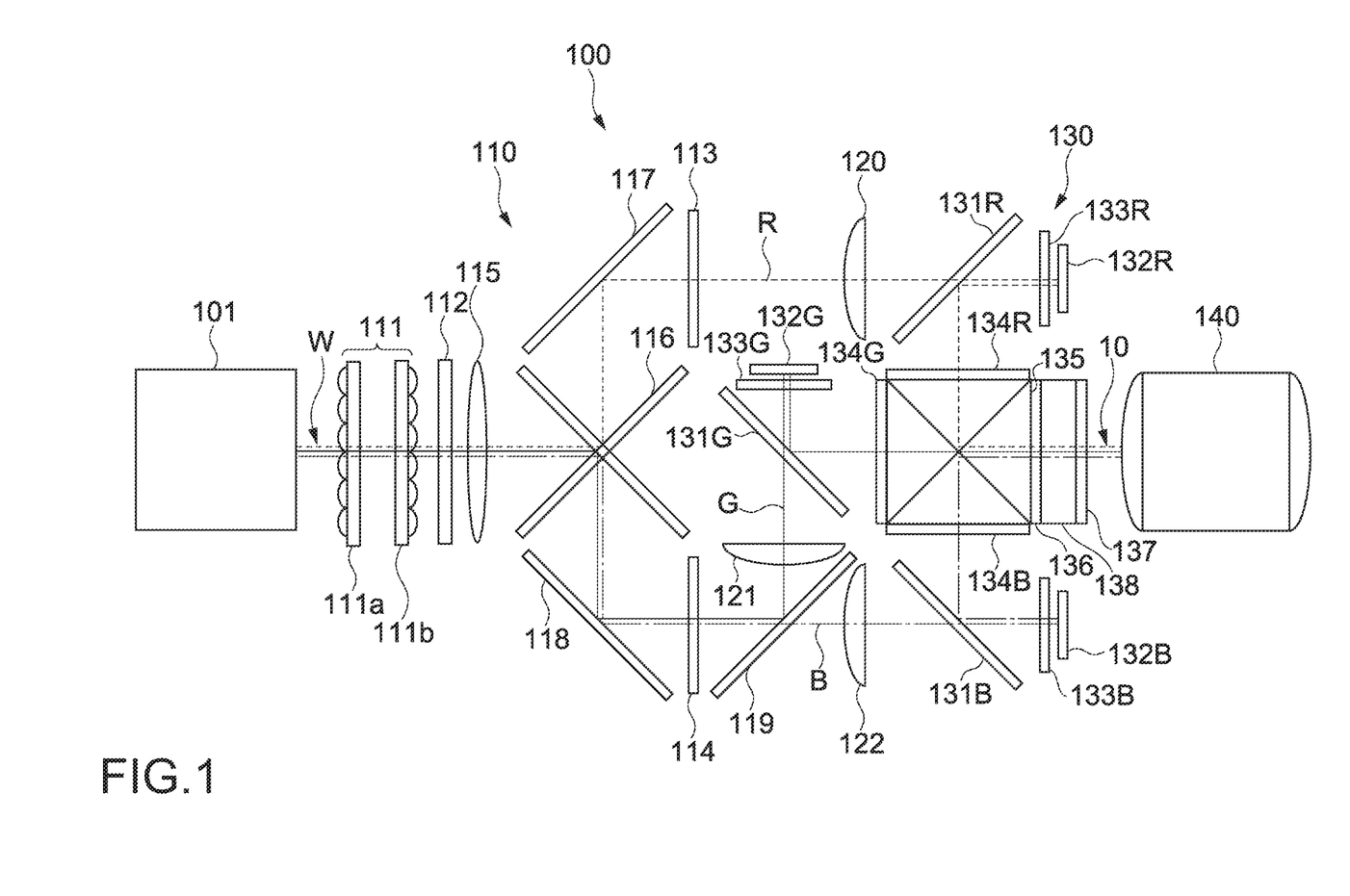
FIG. 1 is a schematic view showing a configuration example of an image display apparatus according to an embodiment of the present technology.

FIG. 1 is a schematic view showing a configuration example of an image display apparatus according to an embodiment of the present technology. An image display apparatus 100 is used as a projector for, for example, a presentation or a digital cinema. The present technology described below is also applicable to an image display apparatus used for other applications.

The image display apparatus 100 includes a light source section 101, an illumination optical system 110, an image generation section 130, and a projection optical system 140.

The light source section 101 generates and emits white light W to the illumination optical system 110. In the light source section 101, for example, a solid-state light source such as an LED (Light Emitting Diode) and an LD (Laser Diode), a mercury lamp and a xenon lamp is arranged.

For example, a solid-state light source for RGB capable of emitting light of each color of RGB may be used, and the emitted light may be synthesized to generate the white light W. Alternatively, a solid-state light source that emits light in a blue wavelength band, and a phosphor that is excited by the blue light and emits yellow fluorescence may be arranged. In this case, blue light and yellow light are synthesized to emit white light W.

The illumination optical system 110 includes an integrator element 111, a polarization conversion element 112, polarizing elements 113 and 114, a condenser lens 115, a cross dichroic mirror 116, reflecting mirrors 117 and 118, a dichroic mirror 119, and relay lenses 120, 121 and 122.

The integrator element 111 includes first and second fly-eye lenses 111a and 111b. The white light W is transmitted through the first and second fly-eye lenses 111a and 111b, and brightness unevenness of the white light W is reduced.

The polarization conversion element 112 has a function of aligning the polarization state of the white light W incident through the integrator element 111. As the polarization conversion element 112, any optical element such as a PS converter may be used. The white light W passing through the polarization conversion element 112 is emitted to the cross dichroic mirror 116 through the condenser lens 115.

The cross dichroic mirror 116 separates the white light W emitted from the condenser lens 115 into red light R at a long wavelength side and green light G and blue light B at a short wavelength side. The red light R separated by the cross dichroic mirror 116 is reflected by the reflecting mirror 117 and is incident on the polarizing element 113. The red light R having a polarization state aligned by the polarizing element 113 is emitted to the image generating section 130 through the relay lens 120. As the polarizing element 113, any optical element such as a polarizing plate may be used.

The green light G and the blue light B separated by the cross dichroic mirror 116 are reflected by the reflecting mirror 118 and are incident on the polarizing element 114. The green light G and the blue light B having polarized states aligned by the polarizing element 114 are separated into the green light G at the long wavelength side and the blue light B at the short wavelength side by the dichroic mirror 119.

The green light G separated by the dichroic mirror 119 is emitted to the image generating section 130 via the relay lens 121. The blue light B split by the dichroic mirror 119 is emitted to the image generation section 130 through the relay lens 122.

The image generation section 130 includes a reflective polarizing element 131 (131R, 131G, 131B), a reflective light modulation element 132 (132R, 132G, 132B), a wavelength plate 133 (133R, 133G, 133B), and a polarizing plate 134 (134R, 134G, 134B), which are arranged for each color of RGB. The image generating section 130 includes a color synthesizing prism 135, a polarization scrambler 136, and a ¼ wave plate 137.

The reflective polarizing element 131 is a wire grid polarizer. In the present embodiment, each light of RGB is emitted from each of the relay lenses 120 to 122 shown in FIG. 1 so as to be P-polarized with respect to an optical plane of the reflective polarizing element 131.

The reflective polarizing element 131R emits the P-polarized component of the red light R toward the wavelength plate 133R. The wavelength plate 133R functions as a compensation plate for compensating for the floating of black brightness, causes to rotate a polarization direction of the incident red light R, and outputs the red light R to the reflective light modulation element 132R. A rotation angle of the polarization direction is appropriately set such that an image with high accuracy is projected.

The reflective light modulation element 132R modulates and reflects the incident red light R on the basis of an image signal corresponding to the red light R supplied from outside. The modulated red light R is emitted as image light constituting the red image (hereinafter referred to as image light R using same reference symbol). As the reflective light modulation element 132R, a reflective liquid crystal panel is typically used, but is not limited thereto.

The image light R emitted from the reflective light modulation element 132R is incident on the reflective polarizing element 131R via the wavelength plate 133R. The S-polarized component of the image light R is reflected by the optical surface and is incident on the polarizing plate 134R arranged on the optical path of the image light R.

The polarizing plate 134R aligns the polarization state of the image light R and cuts unnecessary light. In this embodiment, linearly polarized light having a polarization direction parallel to a transmission axis (polarization axis) of the polarizing plate 134R is transmitted through the polarizing plate 134R and is emitted. The image light R emitted from the polarizing plate 134R is emitted to the color synthesizing prism 135.

Similarly, the green light G and the blue light B are modulated by the reflective light modulation elements 132G and 132B, and are emitted as image light G constituting a green image and image light B constituting a blue image. The image lights G and B are reflected by the reflective polarizing elements 131G and 131B, and are incident on the polarizing plates 134G and 134B arranged on the optical paths of the image lights G and B, respectively. The image lights G and B are emitted to the color synthesizing prism 135 as linearly polarized lights each having a polarization direction parallel to the transmission axis of each of the polarizing plates 134G and 134B.

In the present embodiment, an inorganic polarizing plate is used as the polarizing plate 134 (134R, 134G, 134B). It should be appreciated that it is not limited thereto, and a polarizing plate having an arbitrary structure may be used.

In the present embodiment, the reflective light modulation element 132 (132R, 132G, 132B) correspond to a light modulation element that modulates the incident light and emits the image light. The polarizing plate 134 (134R, 134G, and 134B) corresponds to a polarizer that causes to transmit linearly polarized light having a predetermined polarization direction. As the polarizer, there may be a case where an optical element other than a polarizing plate is used.

The color synthesizing prism 135 is, for example, formed by bonding a plurality of glass prisms (four right isosceles prisms having substantially identical shapes). Two interference films having predetermined optical characteristics are formed on a bonding surface of each glass prism. The first interference film reflects the blue light B and causes to transmit the red light R and the green light G. The second interference film reflects the red light R and causes to transmit the blue light B and the green light G.

The image lights R and B are reflected by the bonding surface, and the image light G is transmitted through the bonding surface. As a result, images RGB are synthesized on the same optical path, and the image light 10 constituting the color image is generated. The image light 10 is emitted to the polarization scrambler 136.

The polarization scrambler 136 converts the polarization state of the incident light and emits the light as the light in the non-polarized state. In the present embodiment, the polarization state of the image light 10 (image lights R, G, B) synthesized by passing through the polarizing plates 134R, 134G, and 134B is converted and emitted as the light in the non-polarized state.

The light in the non-polarized state is light that is not polarized, and includes, for example, natural light or the like. Lights having polarization directions distributed substantially uniformly in all directions are also included in the light in the non-polarized state. Lights including various polarization states are also included in the light in the non-polarized state. Lights including a plurality of lights having polarization components of substantially equal intensity and different polarization directions from each other are also included in the light in the non-polarized state.

Figure 2:
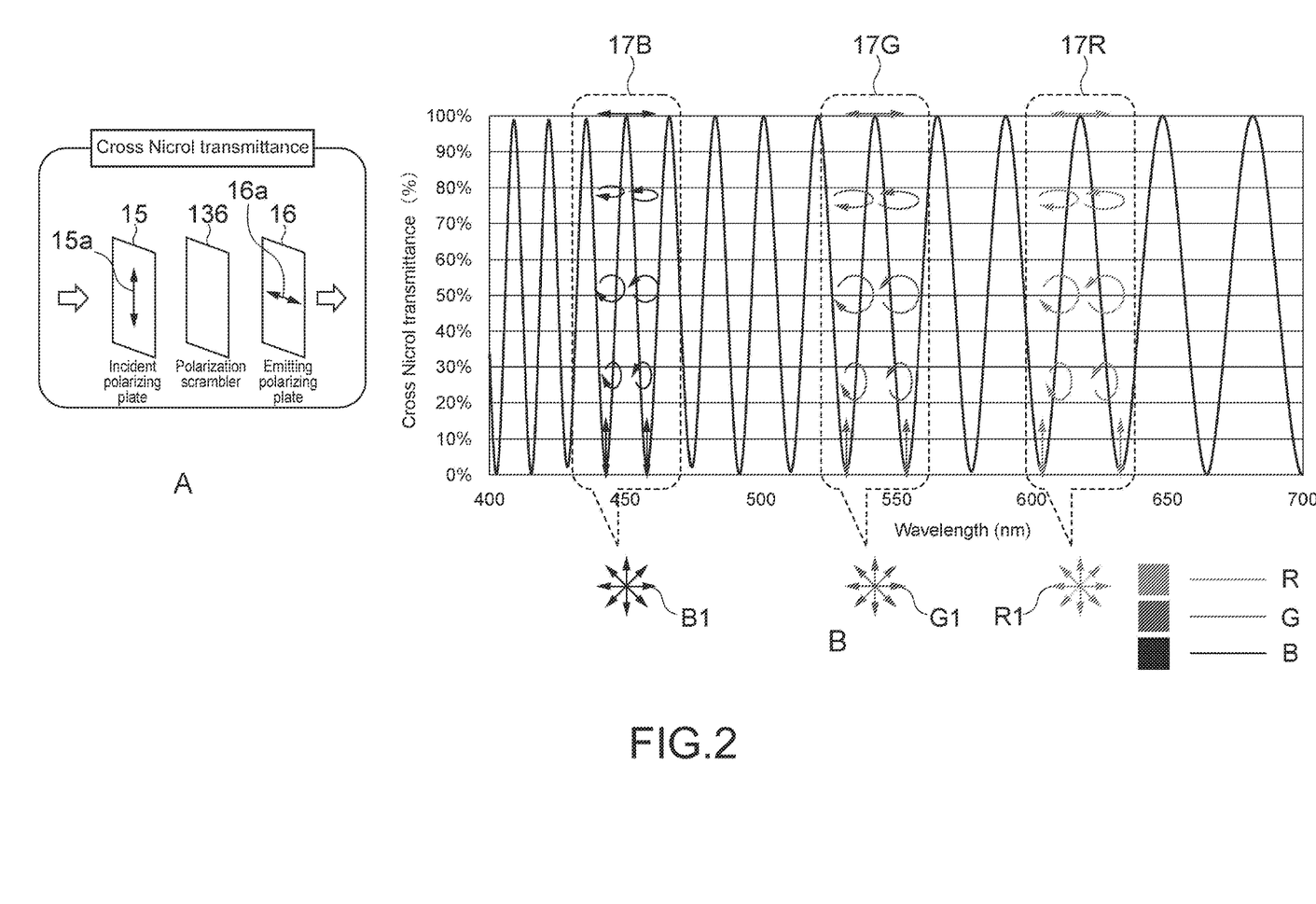
FIG. 2 is a graph for explaining polarization characteristics of a polarization scrambler.

FIG. 2 is a graph for explaining polarization characteristics of the polarization scrambler 136. As the polarization scrambler 136, an element having an optical axis and capable of converting the polarization state by adding a phase difference (optical path difference) to two polarization components orthogonal to the incident light is typically used. By appropriately designing a thickness of such an element, it becomes possible to convert the polarization state of the incident light such that the polarization state is different for each wavelength of the incident light.

As a result, in a case where light included in a predetermined wavelength band (light including plural wavelength lights) is made to be incident, it becomes possible to generate the light in the non-polarized state including lights in the various polarization states. Incidentally, the optical axis corresponds to a slow axis or a fast axis.

As shown in FIG. 2A, two polarizing plates 15 and 16 are arranged such that their transmission axes 15a and 16a are substantially perpendicular to each other. Then, the polarization scrambler 136 is arranged therebetween, and a cross Nicol transmittance for each wavelength is measured.

As shown in FIG. 2B, it can be seen that the transmittance changes greatly periodically for each wavelength. The change in the transmittance corresponds to a change in the polarization state. For example, the wavelength light having the transmittance close to 0% is not converted into the polarization state. That is, the light transmitted through the polarization scrambler 136 becomes the linearly polarized light having the polarization direction parallel to the transmission axis 15a of the polarizing plate 15.

As to the wavelength light having the transmittance close to 100% value, the polarization direction is rotated substantially 90 degrees. That is, the light transmitted through the polarization scrambler 136 becomes the linearly polarized light having the polarization direction parallel to the transmission axis 16a of the polarizing plate 16.

As schematically shown in FIG. 2B, the wavelength light having the transmittance close to 50% is converted into circularly polarized light by the polarization scrambler 136. The wavelength light having the transmittance corresponding to the range from 0% to 50% is converted into longitudinally elliptically polarized light (elliptically polarized light having many polarization components parallel to the transmission axis 15a). The wavelength light having the transmittance corresponding to the range from 50% to 100% is converted into horizontally long elliptically polarized light (elliptically polarized light having many polarization components parallel to the transmission axis 16a).

Thus, the light incident on the polarization scrambler 136 is converted into a different polarization state at each wavelength. A red wavelength band 17R, a green wavelength band 17G, and a blue wavelength band 17B, each of which is surrounded by a dashed line, include lights in the various polarization states. As a result, the image lights R, G, and B of each color are converted into lights R1, G1, and B1 in the non-polarized state by the polarization scrambler 136.

The polarization scrambler 136 is made of, for example, a uniaxial crystal material. It is possible to use an inorganic material having an axis on the material itself, such as quartz, sapphire, lithium niobate, and yttrium vanadate. In this case, the thickness of the polarization scrambler 136 is set to, for example, 0.5 mm or more, but may be arbitrarily designed such that desired polarization characteristics are exhibited. It is possible to use a quartz plate or the like whose thickness is appropriately set.

The polarization scrambler 136 may also be formed of, for example, a uniaxial organic material. For example, it is also possible to realize the polarization scrambler by an organic film such as polycarbonate and polyolefin. In this case, the thickness of the polarization scrambler 136 is set to, for example, 1.0 mm or more, but may be arbitrarily designed such that the desired polarization characteristics are exhibited.

Alternatively, any configuration may be employed to realize the polarization scrambler 136. Any wavelength plate using quartz, a wavelength plate film, an inorganic retardation film, or the like can be used as the polarization scrambler 136. Note that when the polarization scrambler 136 is formed of each of configurations of a multilayer film, a multilayer inorganic vapor deposition film, and multilayer quartz, the configuration of the multilayer quartz is high in resistance to moisture absorption, deterioration, and the like. In view of this, for the image display apparatus of a high brightness model, it is considered that the polarization scrambler 136 using the inorganic material such as quartz is effective. It should be appreciated that the application of the present technology is not limited to this material or configuration.

The ¼ wave plate 137 shown in FIG. 1 is arranged on the optical path of the image light 10, which is the light in the non-polarized state emitted from the polarization scrambler 136. In addition, the ¼ wave plate 137 is arranged between the polarization scrambler 136 and the projection optical system 140.

In the present embodiment, the polarization scrambler 136 is connected to one surface portion of a base portion made of a translucent material. The ¼ wave plate 137 is connected to the other side of the base portion so as to face the polarization scrambler 136. The configuration for placing the ¼ wave plate 137 on the optical path is not limited and may be arbitrarily designed.

The ¼ wave plate 137 gives a 90 degree phase difference to a plane of polarization of the incident light. The specific configuration of the ¼ wave plate 137 is not limited and may be arbitrarily designed.

In the present embodiment, the polarization scrambler 136 corresponds to a polarization conversion element that converts the polarization state of the linearly polarized light transmitted through the polarizer and emits the light in the non-polarized state. The ¼ wave plate 137 corresponds to a ¼ wave plate arranged on the optical path of the light in the non-polarized state emitted from the polarization conversion element.

Figure 3:
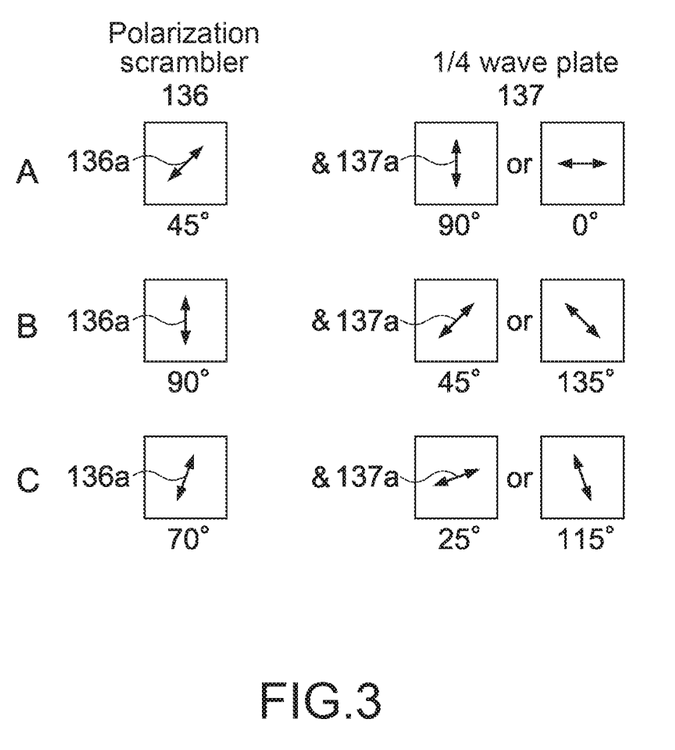
FIG. 3 is a diagram for explaining an arrangement relationship between the polarization scrambler and a ¼ wave plate.

FIG. 3 is a diagram for explaining an arrangement relationship between the polarization scrambler 136 and the ¼ wave plate 137. In the present embodiment, the ¼ wave plate 137 is arranged such that the direction of an optical axis 137a of the ¼ wave plate 137 corresponds to the direction of an optical axis 136a of the polarization scrambler 136. Specifically, as shown in FIG. 3, the ¼ wave plate 137 is arranged such that an angle difference between the direction of the optical axis 137a of the ¼ wave plate 137 and the direction of the optical axis 136a of the polarization scrambler 136 is approximately 45 degrees.

As shown in FIG. 3, a predetermined direction (left-right directions in FIG. 3) is set to 0 degrees, and a counterclockwise direction is set to a positive angular direction. As shown in FIG. 3A, the direction of the optical axis 136a of the polarization scrambler 136 is set to 45 degrees. In this case, the optical axis 137a of the ¼ wave plate 137 is set to 90 degrees or 0 degrees.

As shown in FIG. 3B, the direction of the optical axis 136a of the polarization scrambler 136 is set to 90 degrees. In this case, the optical axis 137a of the ¼ wave plate 137 is set to 45 degrees or 135 degrees. As shown in FIG. 3C, the direction of the optical axis 136a of the polarization scrambler 136 is set to 70 degrees. In this case, the optical axis 137a of the ¼ wave plate 137 is set to 25 degrees or 115 degrees.

It should be appreciated that it is not limited to the angle setting exemplified here, and any configuration can be adopted as long as the angle difference between the direction of the optical axis 137a of the ¼ wave plate 137 and the direction of the optical axis 136a of the polarization scrambler 136 is approximately 45 degrees.

The polarization state of the image light 10 (image lights R, G, B) emitted from the polarization scrambler 136 as the light in the non-polarized state is converted by the ¼ wave plate 137. The image light 10 whose polarization state is converted by the ¼ wave plate 137 is also emitted to the projection optical system 140 as the light in the non-polarized state.

The projection optical system 140 enlarges the image light 10 which is converted into the light in the non-polarized state by the polarization scrambler 136 and the ¼ wave plate 137 to predetermined magnification and projects on an object to be projected such as a screen. Thus, a color image is displayed. The projection optical system 140 includes, for example, a plurality of projection lenses or the like, and a specific configuration may be appropriately designed. In the present embodiment, the projection optical system 140 corresponds to a projection section for projecting the image light.

By converting the image light 10 into the light in the non-polarized state, it is possible to prevent an occurrence of color unevenness and a brightness drop caused by reflection characteristics of the object to be projected such as a screen. For example, depending on an angle of incidence of the light incident on the object to be projected and the polarization state, a reflectance of the light may be different. In this case, if there is a difference in the polarization state of each of the image lights of RGB, the reflectance of the light of each color will vary, resulting in the color unevenness and the brightness drop. In the present embodiment, since the image light 10 is converted into the light in the non-polarized state, the reflectance of the light of each color is substantially equal, and the color unevenness and the brightness drop are prevented.

Further, there is a system in which the light of a predetermined polarization state is made to be transmitted by a 3D glasses and viewed as a right-eye image and a left-eye image. Even in such a system, by converting the image light 10 into the light in the non-polarized state, it is possible to sufficiently prevent the color unevenness and the brightness drop. In addition, even in a case where an image is displayed by an ultra-short focus projector or the like, by applying the present technology, it is possible to sufficiently prevent the color unevenness and the brightness drop.

Note that, in the present embodiment, the image display unit is realized by the reflective light modulation element 132, the wavelength plate 133, the polarizing plate 134, the color synthesizing prism 135, the polarization scrambler 136, and the ¼ wavelength plate 137. The image display unit may be configured to be interchangeable from the image display apparatus 100.

Figure 4:
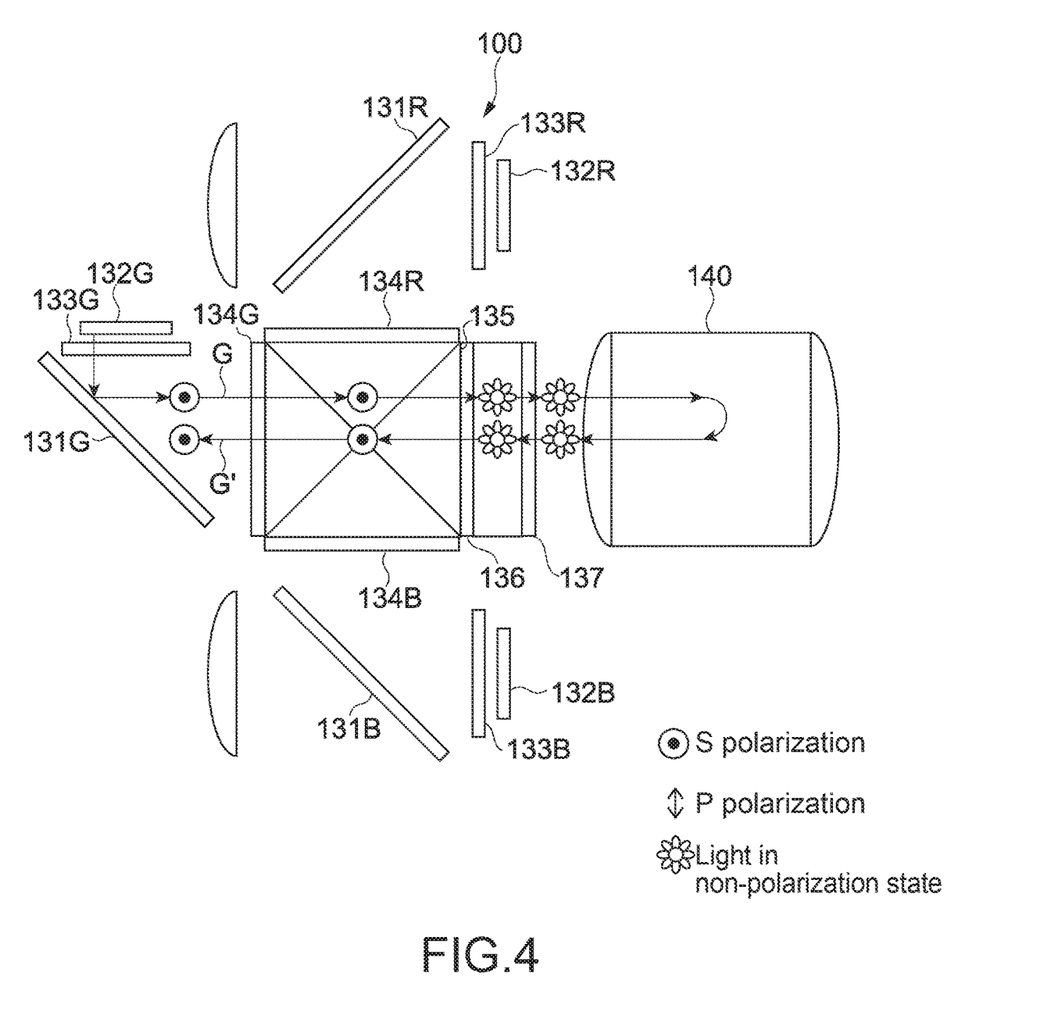
FIG. 4 is a diagram mainly showing an optical path from a reflective light modulation element to a projection optical system.
Figure 5:
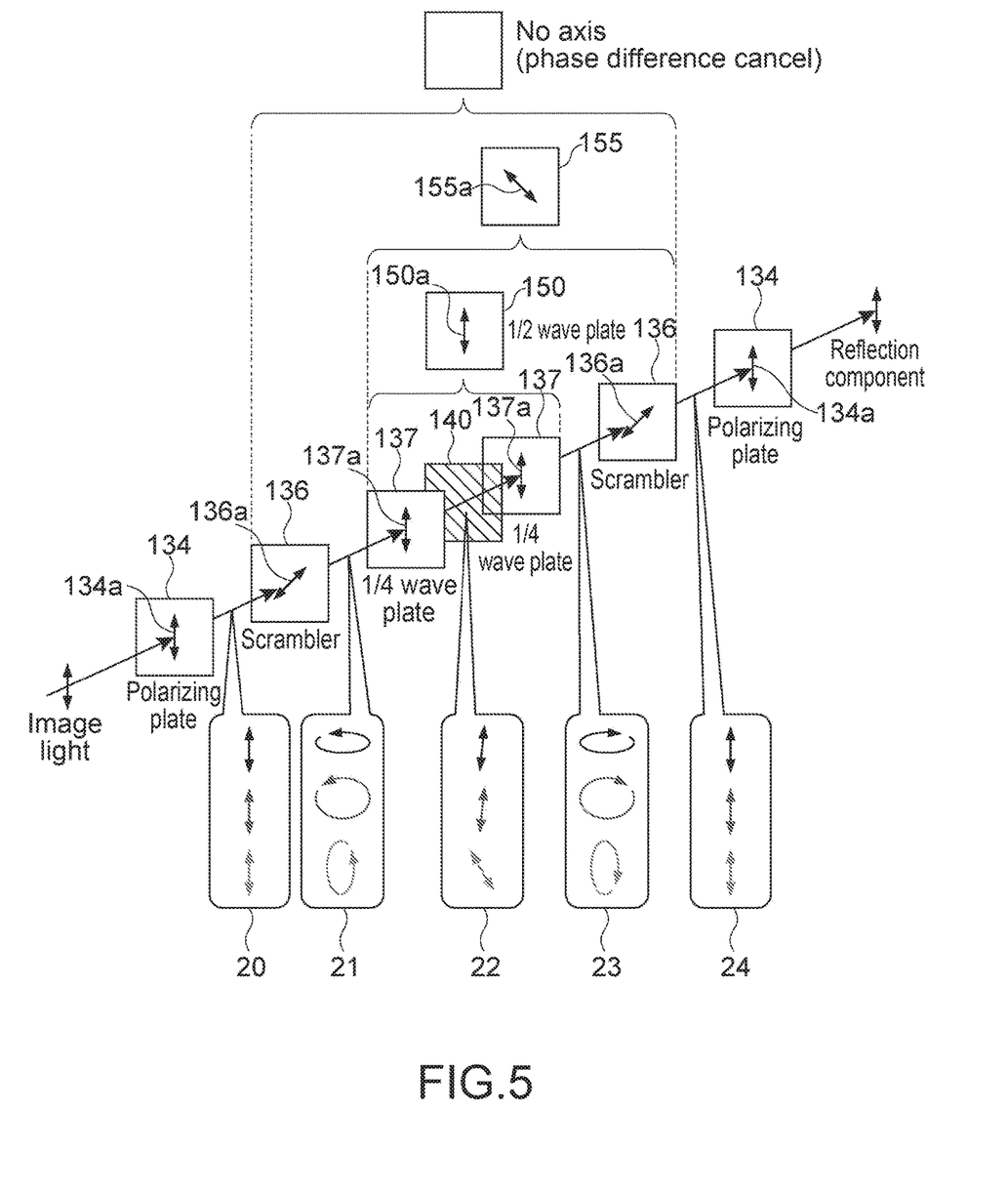
FIG. 5 is a diagram for explaining polarization characteristics for image light traveling through the optical path from the reflective light modulation element to the projection optical system.
Figure 6:
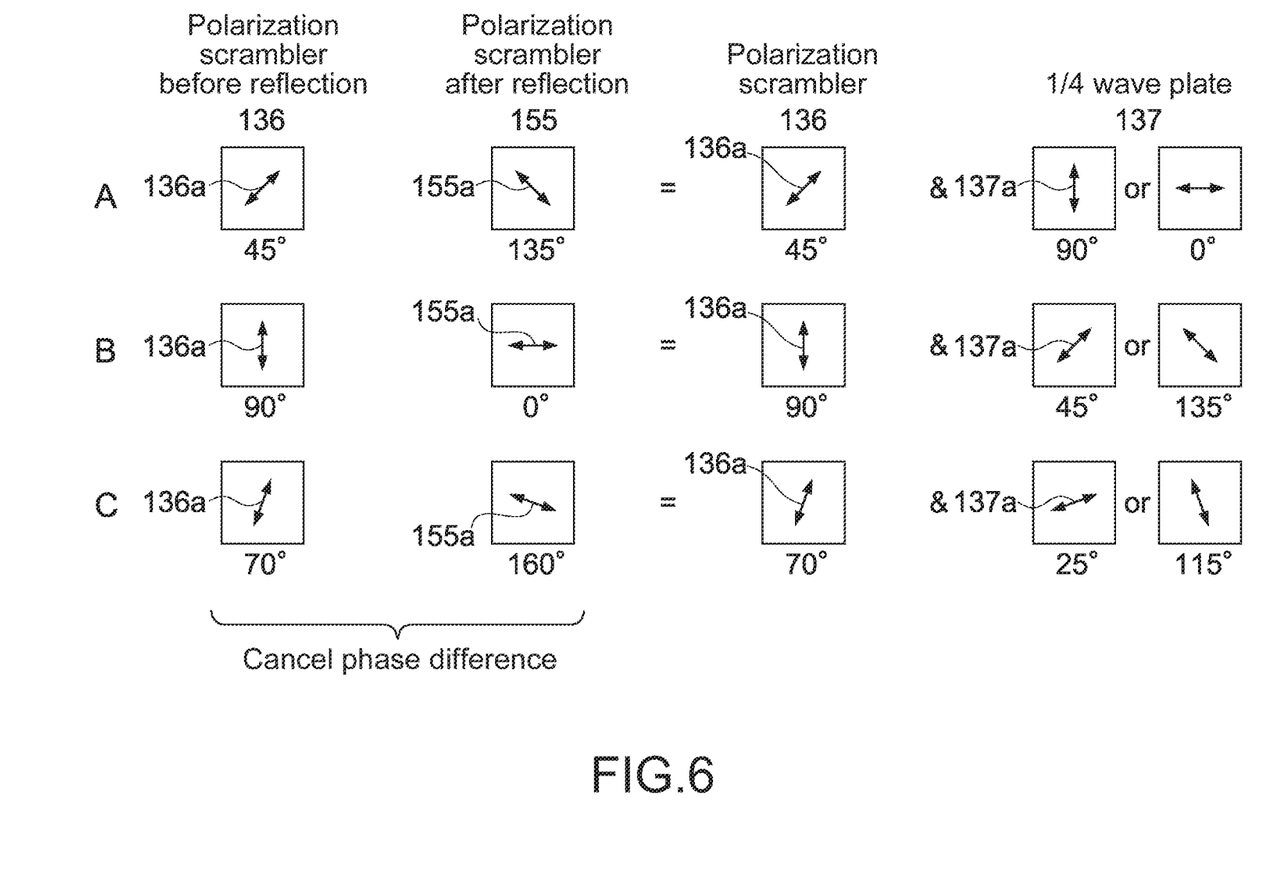
FIG. 6 is a schematic diagram for explaining polarization characteristics for a reflective component reciprocating the optical path from the reflective light modulation element to the projection optical system.

FIGS. 4 to 6 are schematic diagrams for explaining the reflection component of the image light 10 reflected by the projection optical system 140.

FIG. 4 is a diagram mainly showing an optical path from the reflective light modulation element 132 to the projection optical system 140. In FIG. 4, only the green image light G is shown for the sake of clarity of description, but the same effect is obtained for the image light of other colors as a matter of course.

FIG. 5 is a diagram for explaining the polarization characteristics for the image light traveling through the optical path from the reflective light modulation element 132 to the projection optical system 140. FIG. 5 schematically and linearly shows the optical path of the image light 10 traveling from the reflective light modulation element 132 to the projection optical system 140 (outward path) and the optical path (return path) of the reflection component reflected by the projection optical system 140 traveling in the opposite direction.

Also, FIG. 5 schematically shows the polarization states of the image light and the reflection component of each color in frames 20 to 24. The frames 20 to 24 are diagrams showing changes of the polarization states by focusing on some light included in each color light.

The image light G emitted from the reflective light modulation element 132G is incident on the polarizing plate 134G via the wavelength plate 133G and the reflective polarizing element 131G. Here, the image light G is incident on the polarizing plate 134G in a state of being S-polarized with respect to the optical surface of the reflective polarizing element 131. The image light G also in the S-polarized state is emitted from the polarizing plate 134G. As shown in a frame 20 of FIG. 5, linear polarized light having the polarization direction parallel to a transmission axis 134a of the polarizing plate 134 is emitted in each color light of RGB.

The image light G emitted from the polarizing plate 134G is incident on the polarization scrambler 136 via the color synthesizing prism 135. The image light G is converted into the light in the non-polarized state by the polarization scrambler 136. Needless to say, each color light of RGB is converted into the light in the non-polarized state.

In the example shown in a frame 21 of FIG. 5, the blue image light B is converted from linearly polarized light to elliptically polarized light including many P-polarized light components. The green image light G is converted from linearly polarized light to circularly polarized light. The red image light R is converted into elliptically polarized light including many S-polarized light components. Of course, as illustrated in FIG. 2, respective color lights of RGB are converted into the lights in the non-polarized state including the lights in the various polarization states.

As shown in FIG. 4, the image light G converted into the light in the non-polarized state by the polarization scrambler 136 is transmitted through the ¼ wave plate 137. From the ¼ wave plate 137, as the light in the non-polarized state, the image light G is emitted. It is also possible that the image light G is converted into the light in the non-polarized state by the polarization scrambler 136 and the ¼ wave plate 137.

In the example shown in a frame 22 of FIG. 5, each color light of RGB is converted into elliptically polarized light close to the linear polarized light different from the frame 21 (FIG. 5 schematically represents linear polarized light), respectively by the ¼ wave plate 137. Needless to say, respective color lights of RGB are the lights in the non-polarized state including the lights in the various polarization states.

As shown in FIG. 4, it assumes that a reflection component G' reflected by the projection optical system 140 is generated. In this case, the reflection component G' is again incident on the ¼ wave plate 137 in a state of substantially maintaining the polarization state. As a result, as shown in a frame 23 of FIG. 5, the polarization state is converted in each color light of RGB.

As shown in FIG. 5, each color light of RGB will be transmitted twice through the ¼ wave plate 137. Accordingly, the polarization characteristics substantially equal to the case that each color light of RGB is transmitted through a ½ wave plate 150 are exhibited. That is, it substantially equals to that the reflection component G is transmitted through the ½ wave plate 150 in which an optical axis 150a is set in a direction intersecting the optical axis 136a of the polarization scrambler 136 by approximately 45 degrees.

The ½ wave plate 150 gives a phase difference of 180 degrees to the plane of polarization of the incident light. Therefore, as shown in the frame 23 of FIG. 5, each color light of RGB becomes circularly and elliptically polarized light of being rotated opposite to the polarization state shown in the frame 21. As shown in FIG. 4, the reflection component G' transmitted through the ¼ wave plate 137 is incident on the polarization scrambler 136 as the light in the non-polarized state.

FIG. 6 is a schematic diagram for explaining the polarization characteristics for the reflective component reciprocating the optical path from the reflective light modulation element 132 to the projection optical system 140. An arrangement relationship between each member shown in FIG. 6A to C corresponds to the arrangement relationship shown in FIG. 3A to C.

An attention is paid to a relationship between the polarization characteristics of the polarization scrambler 136 with respect to the image light 10 before being reflected by the projection optical system 140 and the polarization characteristics of the polarization scrambler 136 with respect to the reflection component reflected by the projection optical system 140.

The reflection component reflected by the projection optical system 140 will be transmitted twice through the ¼ wave plate 137, considering after transmitting through the polarization scrambler 136. That is, after transmitting through the polarization scrambler 136, it becomes substantially equal to transmitting through the ½ wave plate 150. Then, it is incident on the polarization scrambler 136 again.

Therefore, as shown in FIGS. 5 and 6, with respect to the reflection component, it exhibits the polarization characteristics substantially equal to those of transmitting through the polarization scrambler 155 in which the optical axis 155a is set in a direction intersecting the optical axis 136a of the polarization scrambler 136 by substantially 45 degrees. Therefore, the phase difference with respect to the incident light will be canceled and an effect of the polarization scrambler is canceled.

As a result, in each color light of RGB, it is converted into a polarized state substantially equal to the polarization state before being incident on the polarization scrambler 136 in the outward path. In each color light shown in a frame 24 of FIG. 5, the polarization state substantially will be equal to the polarization state shown in the frame 20.

As shown in FIG. 5, with respect to the reflection component reflected by the projection optical system 140, the polarization characteristics will be substantially equal to those transmitted through an optical member with no axis and be substantially equivalent to that no conversion to the polarization state is performed. Therefore, as shown in FIG. 4, the reflection component G' emitted from the polarization scrambler 136 becomes substantially S-polarized light, and is transmitted without hardly reflecting by the polarizing plate 134G. The same applies to each color light of RGB, and the reflection component is transmitted through the polarized light 134 and returned to the reflective light modulation element 132.

Figure 7:
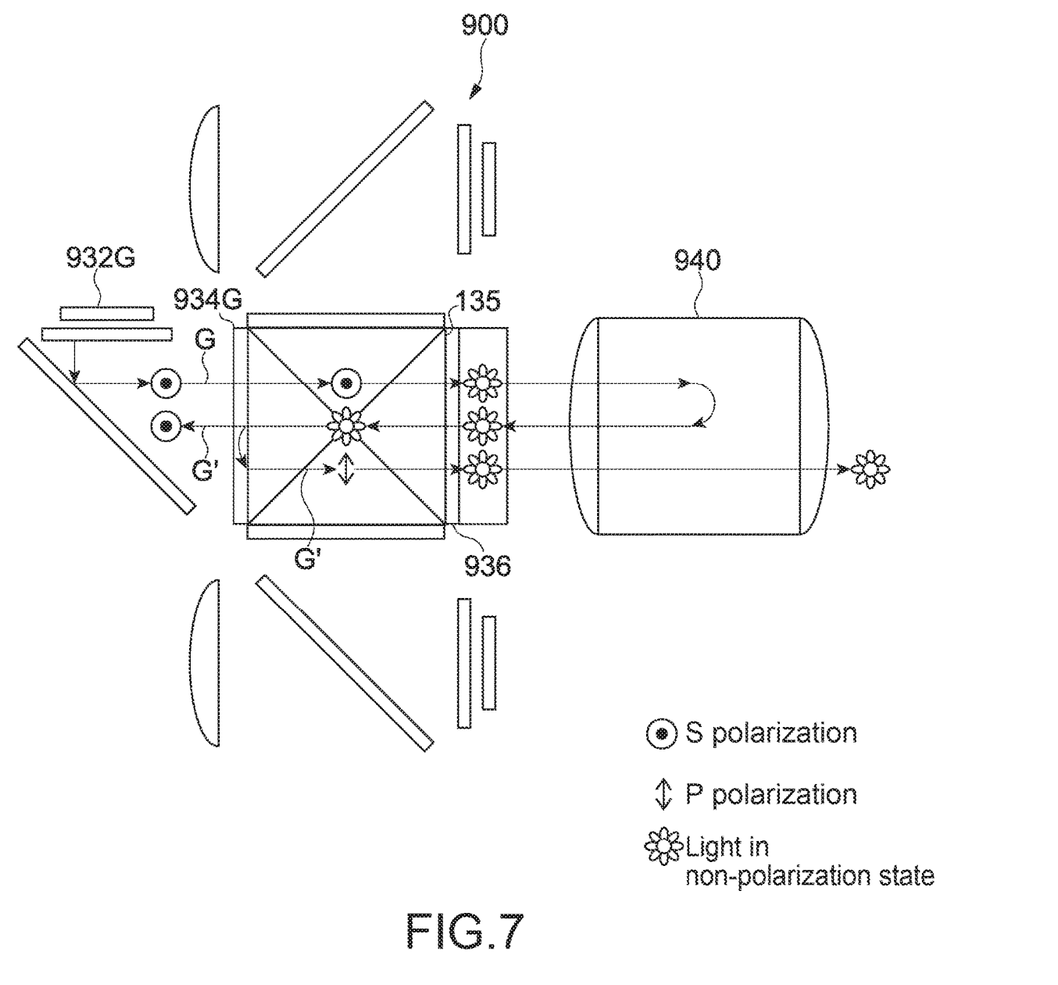
FIG. 7 is a diagram showing a configuration example of an image display apparatus as a comparative example

FIG. 7 is a diagram showing a configuration example of an image display apparatus 900 as a comparative example. The image display apparatus 900 has a configuration that no ¼ wave plate is arranged between a polarization scrambler 936 and a projection optical system 940.

In this case, the reflection component G' reflected by the projection optical system 940 out of the image light G emitted from the reflective light modulation element 932G becomes the light in the non-polarized state even after passing through the polarization scrambler 936. Accordingly, a P-polarized component of the reflection component G' is reflected by the polarizing plate 934G due to a back surface reflection of the polarizing plate 934G or the like. The reflected P-polarized light component is converted into the light in the non-polarized state by the polarization scrambler 136 and is projected onto a screen or the like by the projection optical system 940.

Therefore, in the image display apparatus 900, the reflection component reflected by the projection optical system 940 becomes a ghost component, and is projected onto a screen or the like. This happens in the same way for each color light of RGB. As a result, the quality of the displayed image is greatly deteriorated.

In contrast, in the image display apparatus 100 according to the present embodiment, in each color light of RGB, the reflection component reflected by the projection optical system 140 is hardly reflected by the polarizing plate 134 and is transmitted through the polarizing plate 134. Therefore, it becomes possible to sufficiently suppress an occurrence of a ghost component caused by the back reflection or the like of the polarizing plate 134 and to display a very high quality image.

The polarizing plate 134 shown in FIG. 5 is arranged such that the direction of the transmission axis 134a of the polarizing plate 134 corresponds to the direction of the optical axis 136a of the polarization scrambler 136. Thus, the effect of the polarized light scrambler is sufficiently exhibited, it is found that it becomes possible to sufficiently prevent the occurrence of the color unevenness and the brightness drop. Specifically, the angle difference between the direction of the transmission axis 134a of the polarizing plate 134 and the direction of the optical axis 136a of the polarization scrambler 136 is approximately 45 degrees, it is thus possible to sufficiently prevent the occurrence of the color unevenness, the brightness drop, and the like.

As described above, in the image display apparatus 100 according to the present embodiment, the linearly polarized light transmitted through the polarizing plate 134 is converted into the light in the non-polarized state. The ¼ wave plate 137 is arranged on the optical path of the light in the non-polarized state. Thus, it becomes possible to prevent the reflection component of the light in the non-polarized state traveling in the opposite direction of the optical path from being reflected again by the polarizing plate 134. Therefore, it becomes possible to sufficiently reduce a reflection ghost while maintaining the effect of the polarization scrambler. As a result, it becomes possible to display a high-quality image.

OTHER EMBODIMENTS

The present technology is not limited to the embodiments described above, and can achieve various other embodiments.

Figure 8:
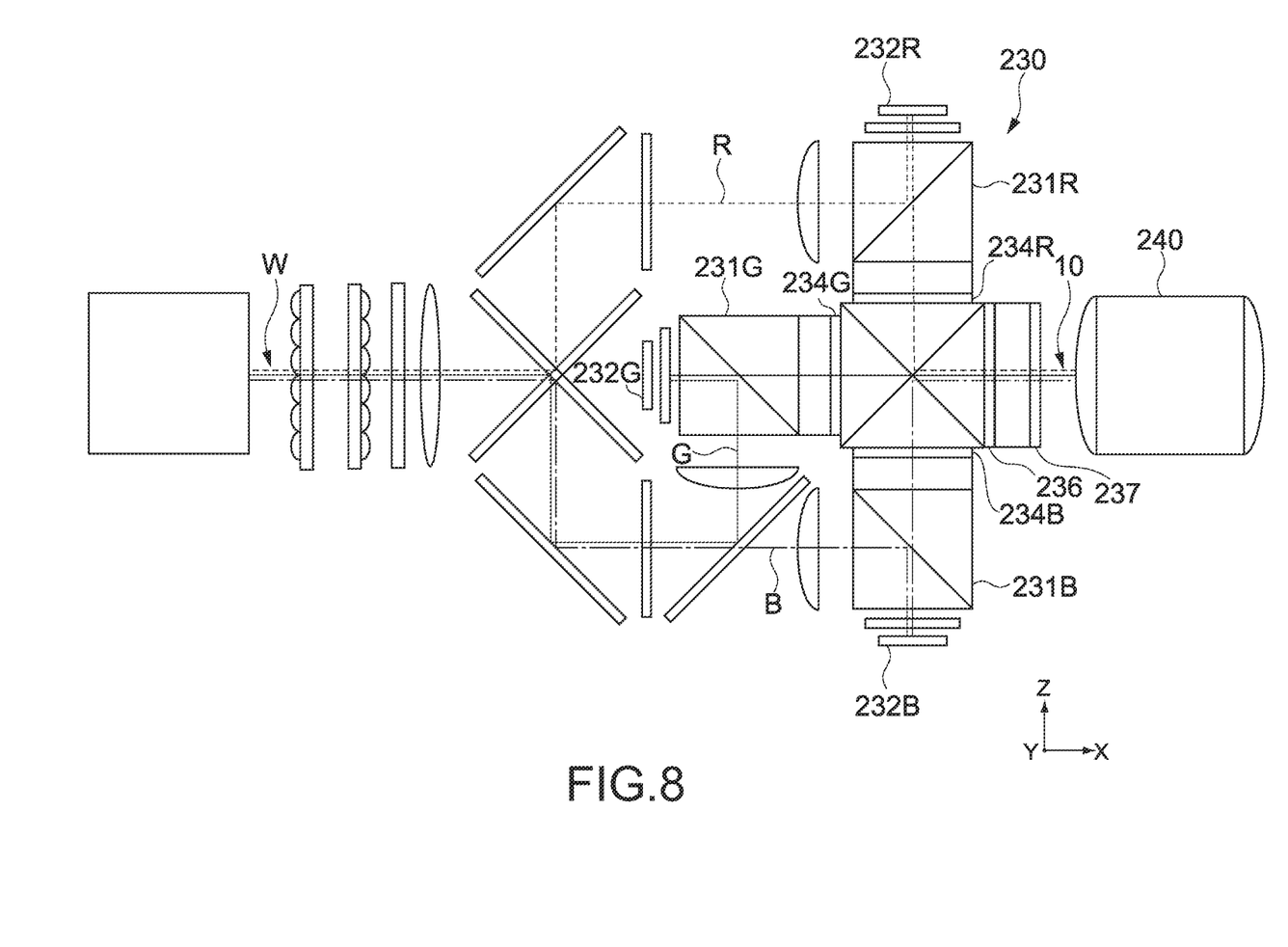
FIG. 8 is a schematic diagram showing other configuration example of the image generating section.
Figure 9:
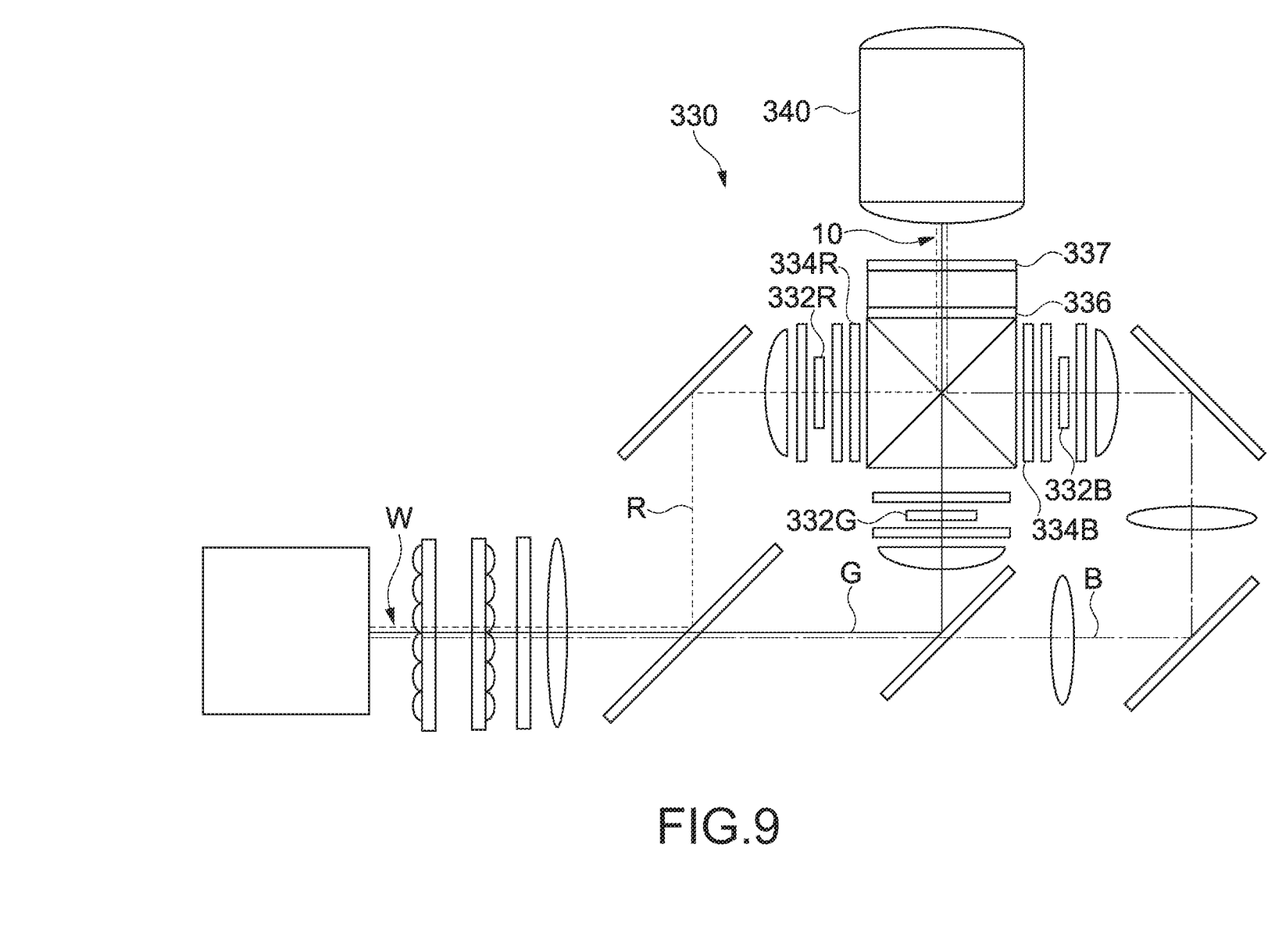
FIG. 9 is a schematic diagram showing other configuration example of the image generating section.
Figure 10:
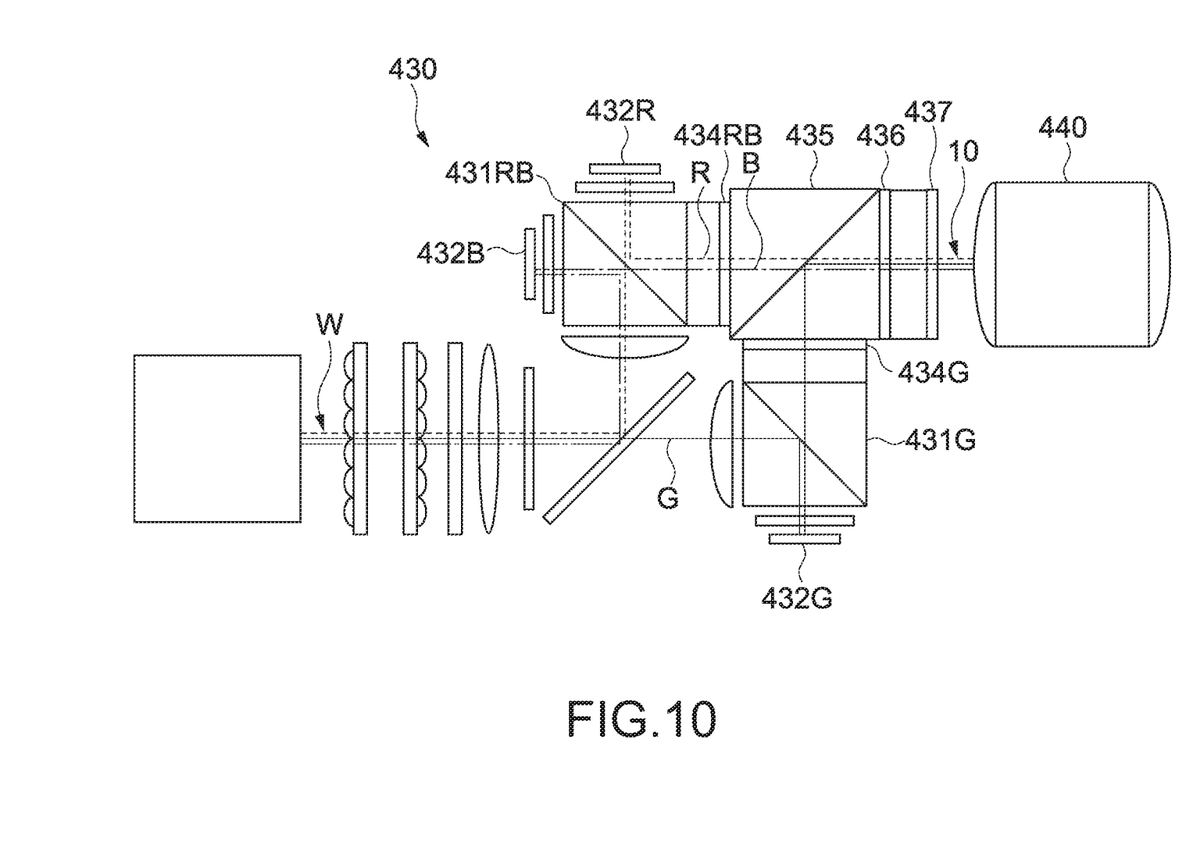
FIG. 10 is a schematic diagram showing other configuration example of the image generating section.

FIGS. 8 to 10 are schematic diagrams showing other configuration examples of the image generating section. As in the image generating section 230 shown in FIG. 8, as a reflective polarizing element 231 (231R, 231G, and 231B), other polarizing elements such as prism type beam splitters may be used instead of the wire grid polarizers. In addition, a direction in which a reflective light modulation element 232 (232R, 232G, 232B) is arranged is not limited, and may be designed as appropriate.

Similar to the above-described embodiments, a polarizing plate 234 (234R, 234G, 234B), a polarization scrambler 236, and a ¼ wave plate 237 are arranged on the optical path of the image light 10 (image lights R, G, B). Thus, it becomes possible to sufficiently reduce the reflection ghost due to the reflection component reflected by a projection optical system 240 and to display a high-quality image.

As in an image generation section 330 shown in FIG. 9, a transmission type light modulation element 332 (332R, 332G, 332B) may be used. For example, a polarizing plate and a compensation plate are arranged so as to sandwich the transmission type light modulation element 332. Any other configuration may be employed. In the optical paths of the image lights R and B, a polarizing plate 334 (334R, 334B), a polarization scrambler 336, and a ¼ wave plate 337 are arranged in the same manner similar to the above-described embodiments. Thus, it becomes possible to sufficiently reduce the reflection ghost due to the reflection component reflected by a projection optical system 340 and to display a high-quality image. Incidentally, on the optical path of the image light G, similar to other image lights R and B, the polarizing plate may be arranged. Even in this case, since the polarization scrambler 336 and the ¼ wave plate 337 are arranged, the reflection ghost can be sufficiently reduced.

In an image generating section 430 shown in FIG. 10, the green image light G modulated by a reflective light modulation element 432G is reflected by a reflective polarizing element 431G and is incident on a color synthesizing prism 435. The red image light R modulated by a reflective light modulation element 432R and the blue image light B modulated by a reflective light modulation element 432B are emitted along the same optical path by a reflective polarizing element 431RB, and are incident on a color synthesizing prism 435.

Also in such a configuration, a polarizing plate 434 (434G, 434RB), a polarization scrambler 436, and a ¼ wave plate 437 are arranged in this order on the optical path of the image light 10 (image lights R, G, B). Thus, it becomes possible to sufficiently reduce the reflection ghost due to the reflection component reflected by a projection optical system 440 and to display a high-quality image.

Regarding a correspondence relationship between the direction of the optical axis of the polarization scrambler and the direction of the optical axis of the ¼ wave plate, a case in which the angle differences therebetween is set to approximately 45 degrees is described in the above. It is not limited thereto and the effect of reducing the reflection ghost can also be exhibited by setting the angle in the range of, for example, 60 degrees to 30 degrees. On the basis of an allowable range of the image quality of the displayed image, the allowable range of the angle difference may be appropriately set using the angle difference of 45 degrees as a reference. Then, an arbitrary value included in the allowable range may be selected.

The same applies to the relationship between the direction of the transmission axis of the polarizer and the direction of the optical axis of the polarization scrambler. In the above description, the case where the angle difference is set to approximately 45 degrees has been described, but it is not limited thereto. On the basis of the allowable range of the image quality of the displayed image, the allowable range of the angle difference may be appropriately set, and an arbitrary value included in the allowable range may be selected.

Between the polarizing plate and the color synthesizing prism, an optical element such as a ½ wave plate capable of rotating the polarization direction may be arranged. For example, the polarization direction of the image light of each color is made to be converted so as to correspond to the optical characteristics of the bonding surface of the color synthesizing prism. Thus, it becomes possible to increase the brightness of the image. Incidentally, in this case, it can be said that the polarizer according to the present technology is constituted by the polarizing plate and the optical element such as the ¼ wave plate.

As the light modulation element, in addition to the liquid crystal panel, any device such as a digital micromirror device (DMD) may be used.

Each configuration of the image display apparatus, the light source section, the illumination optical system, the image generating section, the projection optical system and the like described with reference to the drawings are merely illustrative, and they can be arbitrarily modified without departing from the scope of the present technology. That is, any other configurations for practicing the present technology may be employed.

In the present disclosure, the concept of "approximately same shape", "approximately uniform", "approximately equal", "approximately orthogonal", "approximately 90 degrees", "approximately 45 degrees", "approximately same", "approximately maintained", "approximately equivalent", "approximately S polarization" and the like mean predetermined ranges (e.g., ±10% range) based on "perfectly same shape", "perfectly uniform", "perfectly equal", "perfectly orthogonal", "perfectly 90 degrees", "perfectly 45 degrees", "perfectly same", "perfectly maintained", "perfectly equivalent", and "perfectly S polarization". It is also possible to simply refer to these concepts as "same shape", "uniform", "equal", "orthogonal", "90 degrees", "45 degrees", "equivalent", "maintain", "equivalent", and "S polarized light", and the like.

At least two of the features of the present technology described above can also be combined. In other words, various features described in the respective embodiments may be combined discretionarily regardless of the embodiments. Further, the various effects described above are not limitative but are merely illustrative, and other effects may be provided.

The present technology may also have the following structures.

(1) An image display apparatus, including:
  a polarizer that causes to transmit linearly polarized light having a predetermined polarization direction;
  a polarization conversion element that converts a polarization state of the linearly polarized light transmitted through the polarizer and emits the light as light in a non-polarized state; and
  a ¼ wave plate that is arranged on an optical path of the light in the non-polarized state emitted from the polarization conversion element.

(2) The image display apparatus according to (1), further including:
  a light modulation element that modulates incident light and emits image light; and
  a projection section that projects the image light, in which
  the polarizer is arranged on an optical path of the image light emitted from the light modulation element, and
  the ¼ wave plate is arranged between the polarization conversion element and the projection section.

(3) The image display apparatus according to (1) or (2), in which
  the polarization conversion element has an optical axis, and
  the ¼ wave plate is arranged such that a direction of an optical axis of the ¼ wave plate corresponds to a direction of the optical axis of the polarization conversion element.

(4) The image display apparatus according to (3), in which
  the ¼ wave plate is arranged such that an angle difference between the direction of the optical axis of the ¼ wave plate and the direction of the optical axis of the polarization conversion element is substantially 45 degrees.

(5) The image display apparatus according to (3) or (4), in which
  the polarizer has a transmission axis and is arranged such that a direction of the transmission axis of the polarizer corresponds to the direction of the optical axis of the polarization conversion element.

(6) The image display apparatus according to (5), in which the polarizer is arranged such that an angle difference between the direction of the transmission axis of the polarizer and the direction of the optical axis of the polarization conversion element is substantially 45 degrees.

(7) The image display apparatus according to any one of (1) to (6), in which
  the polarization conversion element is formed of a uniaxial crystal material or a uniaxial organic material.

(8) The image display apparatus according to any one of (1) to (7), in which
  the polarizer is a polarizing plate.

(9) An image display unit, including:
  a polarizer that causes to transmit linearly polarized light having a predetermined polarization direction;
  a polarization conversion element that converts a polarization state of the linearly polarized light transmitted through the polarizer and emits the light as light in a non-polarized state; and
  a ¼ wave plate that is arranged on an optical path of the light in the non-polarized state emitted from the polarization conversion element.

(10) The image display unit according to (9), further including:
  a light modulation element that modulates incident light and emits image light; in which
  the polarizer is arranged on an optical path of the image light emitted from the light modulation element.

REFERENCE SIGNS LIST

R, G, B image light
R1, G1, B1 light in non-polarized state
G' reflection component
10 image light
100 image display apparatus
101 light source section
110 illumination optical system
130, 230, 330, 430 image generation section
132, 232, 432 reflective light modulation element
134, 236, 334, 434 polarizing plate
136, 236, 336, 436 polarization scrambler
136a optical axis of polarization scrambler
137, 237, 337, 437 ¼ wave plate
137a optical axis of ¼ wave plate
140, 240, 340, 440 projection optical system
332 transmission type light modulation element

The invention claimed is:

1. An image display apparatus, comprising:
  a polarizer that transmits linearly polarized light having a predetermined polarization direction;
  a polarization conversion element that converts a polarization state of the linearly polarized light transmitted through the polarizer and emits the light as light in a non-polarized state; and
  a ¼ wave plate arranged on an optical path of the light in the non-polarized state emitted from the polarization conversion element, and receiving the light in the non-polarized state emitted from the polarization conversion element.

2. The image display apparatus according to claim 1, further comprising:
  a light modulation element that modulates incident light and emits image light; and
  a projection section that projects the image light, wherein
  the polarizer is arranged on an optical path of the image light emitted from the light modulation element, and the ¼ wave plate is arranged between the polarization conversion element and the projection section.

3. The image display apparatus according to claim 1, wherein
the polarization conversion element has an optical axis, and
a direction of an optical axis of the ¼ wave plate corresponds to a direction of the optical axis of the polarization conversion element.

4. The image display apparatus according to claim 3, wherein
an angle difference between the direction of the optical axis of the ¼ wave plate and the direction of the optical axis of the polarization conversion element is substantially 45 degrees.

5. The image display apparatus according to claim 3, wherein
the polarizer has a transmission axis and a direction of the transmission axis of the polarizer corresponds to the direction of the optical axis of the polarization conversion element.

6. The image display apparatus according to claim 5, wherein
an angle difference between the direction of the transmission axis of the polarizer and the direction of the optical axis of the polarization conversion element is substantially 45 degrees.

7. The image display apparatus according to claim 1, wherein the polarization conversion element is formed of a uniaxial crystal material or a uniaxial organic material.

8. The image display apparatus according to claim 1, wherein the polarizer is a polarizing plate.

9. The image display apparatus of claim 1, further comprising a projection optical system that projects received light onto an object,
wherein the projection optical system is arranged on the optical path of the light emitted from the polarization conversion element and is located after the ¼ wave plate on the optical path.

10. An image display apparatus, comprising:
a polarizer that transmits linearly polarized light having a predetermined polarization direction;
a polarization conversion element that converts a polarization state of the linearly polarized light transmitted through the polarizer and emits the light as light in a non-polarized state;
a ¼ wave plate arranged on an optical path of the light in the non-polarized state emitted from the polarization conversion element, and receiving the light in the non-polarized state emitted from the polarization conversion element; and
a projection optical system that projects received light onto an object.

11. The image display apparatus according to claim 10, further comprising:
a light modulation element that modulates incident light and emits image light, wherein
the polarizer is arranged on an optical path of the image light emitted from the light modulation element.

* * * * *